Nov. 27, 1928.  
B. WALKER  
1,693,288  
PARKING DEVICE FOR AUTOMOBILES  
Filed May 3, 1927  
3 Sheets-Sheet 1
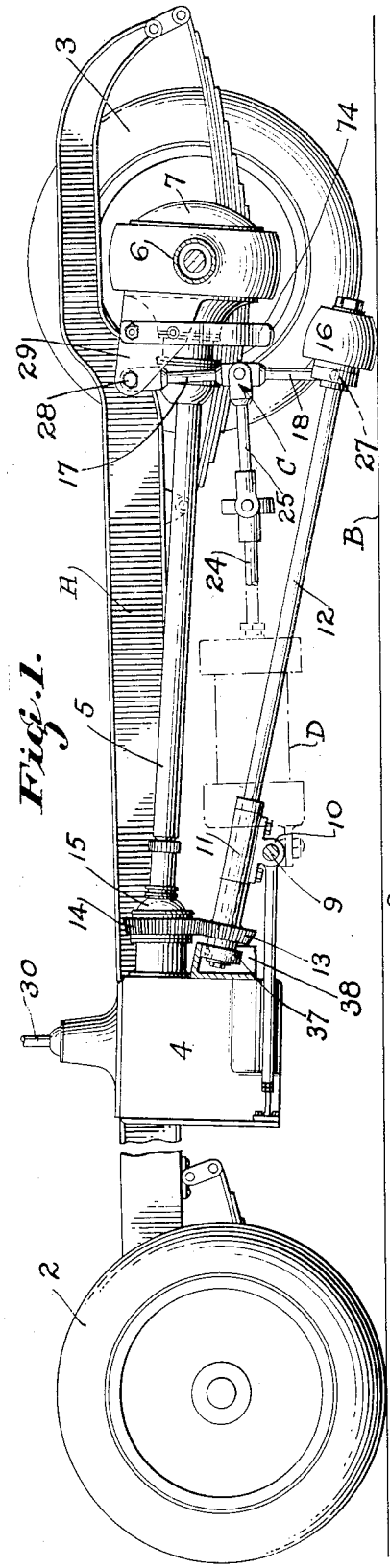
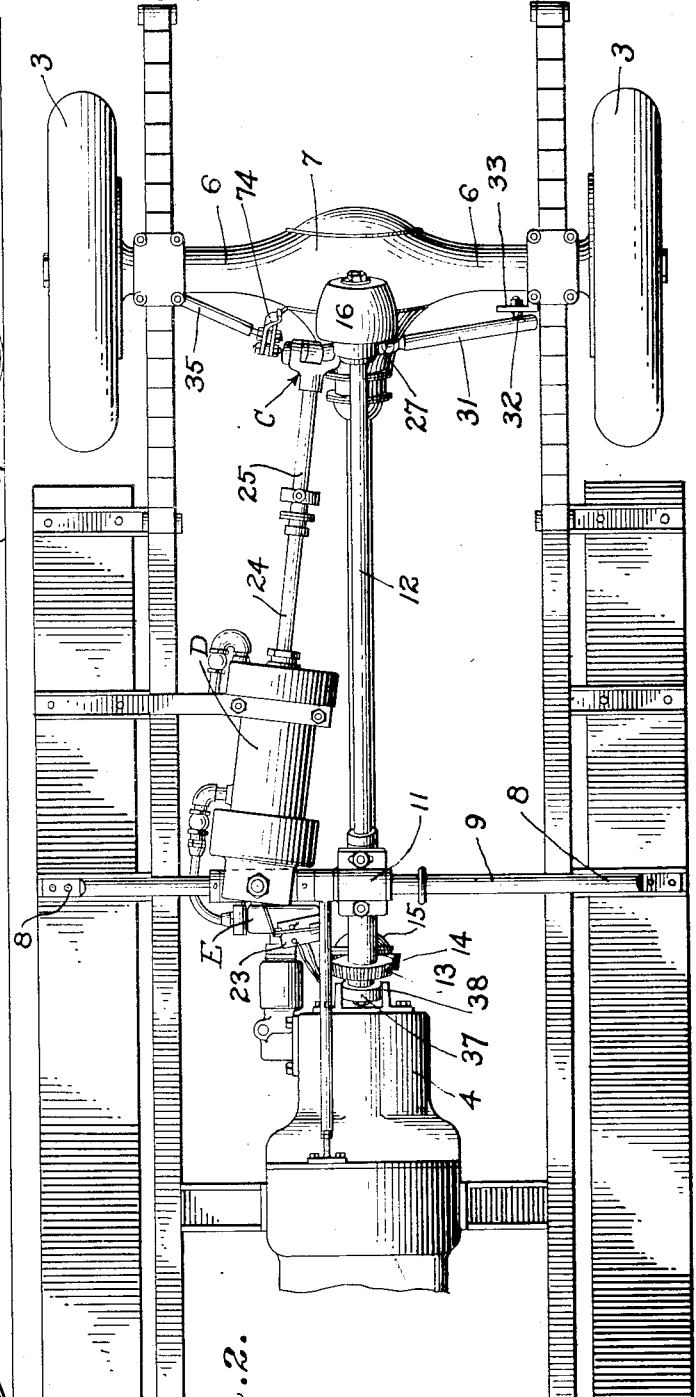
INVENTOR.  
Brooks Walker.  
BY Townsend, Loftus ratkett  
ATTORNEYS.

INVENTOR.
Brooks Walker.
BY
ATTORNEYS.

Nov. 27, 1928.  
B. WALKER  
1,693,288  
PARKING DEVICE FOR AUTOMOBILES  
Filed May 3, 1927 3 Sheets-Sheet 3

INVENTOR.  
Brooks Walker  
BY  
Townsend, Loftus & Abbott  
ATTORNEYS.

Patented Nov. 27, 1928.

1,693,288

UNITED STATES PATENT OFFICE.

BROOKS WALKER, OF PIEDMONT, CALIFORNIA.

PARKING DEVICE FOR AUTOMOBILES. REISSUED

Application filed May 3, 1927. Serial No. 188,429.

This invention relates to a parking device for automobiles and especially to a device whereby the rear end and wheels of an automobile may be raised with relation to a pavement and moved or swung laterally towards or away from the curbing.

The object of the present invention is to facilitate the parking of automoblies in congested districts where parking space is limited or where automoblies are so closely spaced that it is difficult to approach the curb.

The invention, briefly stated, consists in providing an attachment which is adapted to be operated by engine power, first to raise the rear end of the automobile and secondly, to swing the rear end about the front wheels as a pivot to or away from the curb.

Figure 3:
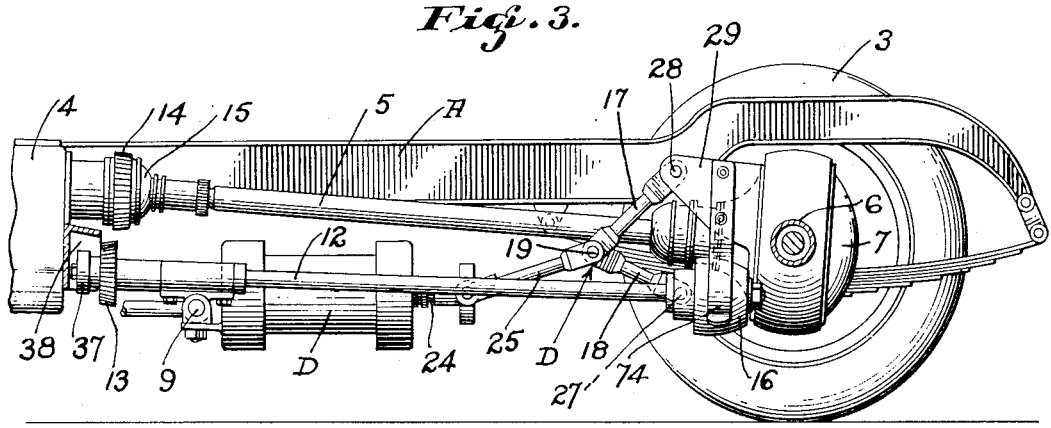
Figure 4:
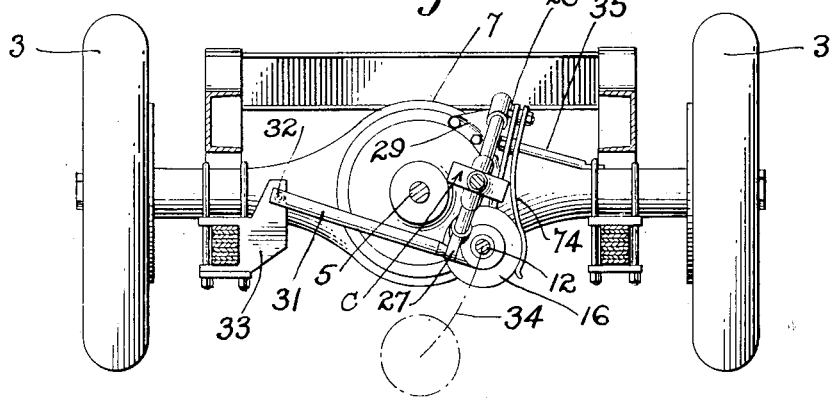
Figure 5:
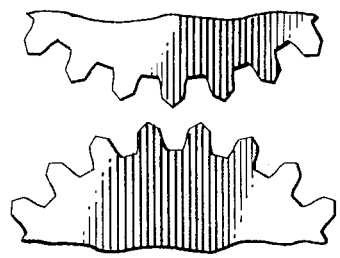
Figure 6:
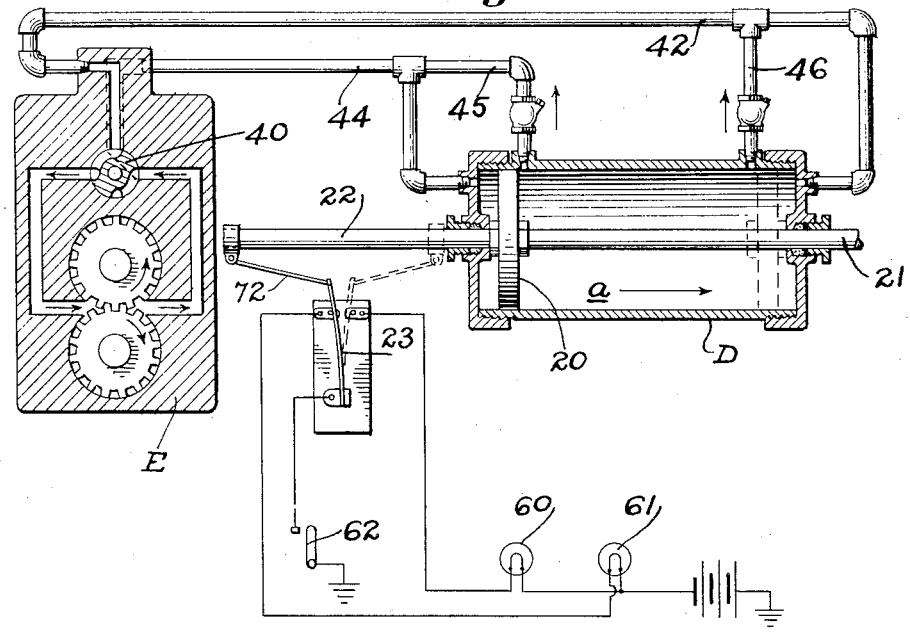

The invention is shown by way of illustration in the accompanying drawings, in which:

Fig. 1 is a partial side elevation of an automobile showing the attachment of the parking device, Fig. 2 is a bottom view of Fig. 1, Fig. 3 is a side elevation similar to Fig. 1 showing the rear end of an automobile and the parking device attached thereto, Fig. 4 is an end view of the automobile and the parking device, Fig. 5 is a detail view showing the shape of the teeth employed in the spur gear drive between the gear transmission shaft and the jack shaft, Fig. 6 is a partial sectional and diagrammatic view of the hydraulic gear pump and the cylinder and piston hydraulically actuated thereby.

Figure 7:
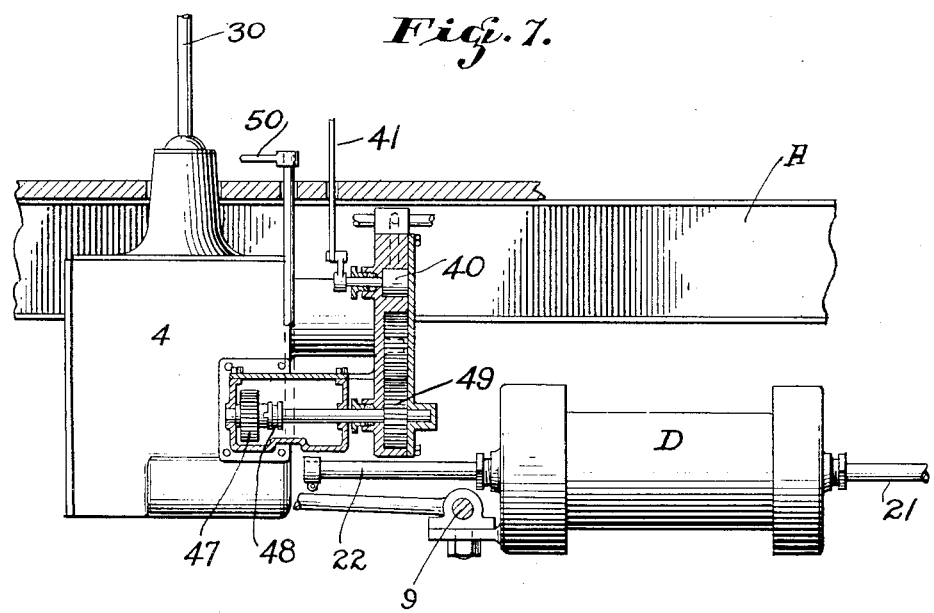

Fig. 7 is a side elevation partially in section showing the method of driving the hydraulic gear pump, said view also showing the position of the hydraulically actuated cylinder and piston.

Referring to the drawings in detail and particularly Fig. 1, A indicates the main frame of an automobile, 2 the front wheels, 3 the rear wheels, 4 a standard form of gear transmission, 5 the propeller shaft driven thereby, 6 the rear axle housing and 7 the differential housing which contains the usual form of differential mechanism whereby the axles supporting the rear wheels are driven. Extending crosswise of the main frame and secured thereto as at 8 is a cross shaft 9 upon which is pivotally supported as at 10 a bearing 11 and journaled in the bearing is a shaft 12 which will hereinafter be referred to as the jack shaft. The jack shaft is in this instance disposed directly below the propeller shaft and aligns therewith. One end of the jack shaft carries a bevel gear 13 which is adapted to be moved into and out of movement with a bevel gear 14 secured on the gear transmission shaft or the universal coupling 15 through which the propeller shaft is driven. The opposite end of the jack shaft carries a roller 16 which is substantially cone-shaped. This roller is keyed to the shaft and is rotated or driven thereby when the gears 13 and 14 are brought into mesh and power is transmitted therethrough, the roller 16 serving the function of swinging the rear end of the automobile laterally about the front wheels as a pivot. The jack shaft also serves a function of raising or elevating the rear end of the automobile and the driving wheels 3 with relation to a pavement such as indicated at B as this is necessary to permit lateral swinging movement of the rear end. Means must accordingly be provided for raising or lowering the rear end with relation to the jack shaft and the roller 16 or conversely for swinging the jack shaft about its pivot 10 downwardly against the pavement so as to elevate the rear end. The means employed is a toggle lever generally indicated at C. This toggle lever consists of two links 17 and 18 centrally connected as at 19. These toggle links normally assume the position shown in Fig. 3 and as such maintains the jack shaft and the roller 16 in an elevated position as shown in Fig. 3. The toggle links are only extended when the rear end is to be elevated and swung laterally and the extended position of the toggle links is shown in Fig. 1. In order that the jack shaft may be swung from the elevated position shown in Fig. 3 to the lowered position shown in Fig. 1 and in order that the rear end may be elevated with relation to the roller when in lowered position, considerable power must be exerted. Power is, in this instance, obtained from a hydraulic cylinder generally indicated at D to which oil or a like fluid medium is delivered through means of a power driven pump generally indicated at E. The cylinder D is provided with a piston 20 and a piston rod 21. The rod extends through opposite ends of the cylinder as shown in Fig. 6, the rearwardly extending end indicated at 22 being employed to actuate a circuit making or breaking switch 23 which will hereinafter be described and the forward end of the rod indicated at 24 is connected through means of a connecting rod 25 with the central pivotal connection 19 of the toggle lever. Hence, if the piston is moved by means of oil under pressure in the direction of arrow $a$ (see Fig. 6), the toggle links will be extended as shown in Fig. 1 and the jack shaft will first be lowered from the elevated position shown in Fig. 3 to lowered position shown in Fig. 1 and the rear end of the automobile together with the driving wheels will next be raised to assume the elevated position also shown in Fig. 1. This is due to the fact that the lower link 18 is pivotally attached as at 28 to a bracket 29 which in this instance is secured to one side of the differential housing. At the same time that the jack shaft 12 is lowered and the rear end elevated, gears 13 and 14 are thrown into mesh. These gears do not mesh as is usually the case by sliding the gears together endwise but conversely by being moved towards each other face to face and it is accordingly necessary to employ gear teeth, the outer ends of which are pointed as indicated in Fig. 5 to insure meshing. After the gears have been brought into mesh and the rear end has been elevated, it is only necessary to move the gear shift lever 30 either into low gear or reverse while the engine clutch is out of mesh, i. e., the gears are thrown into low if it is desired to swing the rear end laterally to the right and into reverse if it is desired to swing the rear end laterally to the left. In either instance after the transmission gears are coupled it is only necessary to let in the clutch in the usual manner as power will then be transmitted through the gear transmission shaft to the gears 14 and 13. The jack shaft 12 together with the roller 16 will thus be rotated either in a right or left-hand direction and the rear end will be swung laterally to one side or another as the case may be. It is thus possible to park the automobile in a comparatively small space and in fact into a space which is only a foot or more longer than the actual length of the car as it is only necessary when approaching the curb to so steer the car that the front end is brought up against the curbing and then to lower the jack shaft and elevate the rear end so that it may be swung towards the curbing; similarly, the same maneuvers being resorted to when it is desired to leave the parking space or curb, the only difference being that the direction of rotation of the jack shaft and roller 16 will be reversed so as to swing the rear end of the automobile outwardly or away from the curb.

It should be realized that when the rear end of the car is elevated as shown in Fig. 1 that the entire weight is imposed on the toggle links C and the roller 16 and that when power is transmitted through the gears 13 and 14 to rotate the jack shaft and the roller 16 that considerable side strain will develop and that there would accordingly be a tendency to bend the jack shaft in one direction or another depending upon the direction of rotation of the shaft and roller. In order to prevent bending of the shaft and to secure it against such movement, the bearing 27 is employed, i. e., the bearing 27 does not only form a pivotal support for the lower end 18 of the toggle lever but it also serves as a pivotal connection for a radius arm 31 (see Figs. 2 and 4). The opposite end of this radius arm or lever is pivotally secured as at 32 to a bracket 33. The radius arm is accordingly of considerable importance as it rigidly secures the jack shaft against side strain when in lowered position. It should be noted that the downward movement of the jack shaft is along the dotted line indicated at 34. In other words, the movement is slightly arcuate at the roller end but it is comparatively small at the pivotal end 10 or with relation to the bearing 11. In fact, the arcuate movement at this end is so small that a slight play or freeness of the bearing is sufficient to take care thereof. The side strain imposed on the jack shaft during its lowered position when swinging the rear end to the right or the left is also transmitted to a large extent to the upper supporting bracket 29. A brace rod such as indicated at 35 is accordingly provided; side thrust is also developed at the upper end of the jack shaft between the gears 13 and 14. A thrust bearing 37 movable between two interspaced side plates 38 is accordingly provided and the thrust is accordingly taken care of.

In actual practice, practically any type of cylinder having a piston movable from end to end thereof may be employed and it should similarly be understood that any type of pump which serves the function of delivering fluid under pressure thereto may be employed. It is, however, necessary to provide a valve such as indicated at 40 to direct the flow of discharging oil to one end of the cylinder or the other as it is not only essential to lower the jack shaft and roller by means of power, but also to return it to its normal or elevated position. The valve 40 is controlled by the driver through means of a lever 41. When it assumes the position shown in Fig. 6, the oil discharging from the pump is delivered to a pipe 42 and enters the outer end of the cylinder, thus driving the piston in a direction opposite to that indicated by arrow *a*. The valve at the same time serves a function of permitting the oil from the opposite end of the cylinder to return to the pump through the pipe 44. Means for limiting the movement of the piston in either direction or the other should also be provided. This is accomplished in the present instance by providing by-pass pipes 45 and 46. For instance, when the piston is travelling in the direction opposite to that indicated by the arrow *a*, its movement is stopped the moment it passes the pipe 45 as the oil can then discharge through the pipes 45 and 44 which return the oil to the pump. Similarly, if the valve 40 is set to discharge the oil from the pump through the pipe 44 the movement of the piston will be stopped the moment it passes the pipe 46. Check valves are employed on both pipes and they only permit an oil flow therethrough in a direction indicated by the arrows. The gear pump in this instance is power driven from the transmission case, i. e., a gear drive such as indicated at 47 (see Fig. 7) is employed. This gear through means of a jaw clutch 48 drives the lower gear 49 of the pump. The jaw clutch is controlled by a lever 50 and as such permits the pump to be thrown into and out of operation whenever desired. In the present instance, a pair of signal lights are employed to indicate the position of the jack shaft and roller 16. These signal lights are indicated at 60 and 61 in Fig. 6. The circuit through the lights is controlled by a pair of switches such as indicated at 62 and 23. Whenever the parking device is required, the operator closes the switch 62. He then sets the valve so as to insure flow of the oil in the proper direction and finally meshes the jaw clutch 48 through the lever 50. If the piston and the rod 22 moves in the direction of arrow *a* (see Fig. 6), the circuit will be closed through the light 60 when the switch 23 assumes the dotted line position. Closing of the circuit through the light 60 indicates that the rear end has been fully elevated and it is then only necessary for the driver to throw out the engine clutch and to operate the gear shift lever to make the proper mesh. When he then lets in the clutch, the jack shaft will be rotated and the rear end of the car will swing sideways in the direction desired. When this has been accomplished, the driver reverses the position of the valve 40 and the piston in the cylinder D will accordingly be reversed. The moment it reaches the position shown in Fig. 6, switch 23 will close the circuit through the light 61 and this will indicate to the driver that the jack shaft has been fully elevated. He then disconnects the jaw clutch through the lever 50 and is ready to drive away. The switch 23 may be connected to the piston rod 22 in any suitable manner. In the present instance an ordinary strap 72 forms the connection.

In view of the fact that there may be a slight leakage between the piston and the cylinder D, it is obvious that the piston would have a tendency to gradually travel outwardly in the direction of arrow *a* due to the weight of the toggle links and jack shaft supported thereby when in raised position and that such leakage would cause the piston to gradually travel outwardly and thereby permit the toggle links to gradually extend and the jack shaft to settle towards the pavement. Means must accordingly be provided for supporting the jack shaft in the raised position. This is accomplished in the present instance by providing a spring latch such as indicated at 74 in Fig. 4. The upper end of the spring latch is secured to the bracket 29 and the lower end of the spring latch is rounded to substantially fit the exterior contour of the roller 16. Hence, when the jack shaft and roller are raised to elevated position, the spring latch is engaged and forced outwardly to a slight extent and as such will grip and secure the roller and the jack shaft and thereby retain the same in elevated position. This spring latch also serves a function of reducing rattle in the connected parts and as such is of considerable importance.

While certain features of the present invention are more or less specifically described and indicated, I wish it understood that various changes may be resorted to within the scope of the appended claims; similarly, that the materials and finish of the several parts employed may be such as the manufacturer may dictate or varying conditions or uses may demand.

Having thus described my invention, what I claim and desire to secure by Letters Patent is:—

1. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, a toggle lever pivotally connected at one end of the jack shaft at a point adjacent the roller, a pivotal connection between the opposite end of the toggle lever and the axle assembly, engine power actuated means whereby the toggle lever is extended or retracted so as to swing the jack shaft about its pivotal support from a raised position to a lowered position or vice versa and means whereby a driving connection between the transmission shaft and the jack shaft is automatically connected or disconnected during pivotal movement of the jack shaft.

2. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, a toggle lever pivotally connected at one end of the jack shaft at a point adjacent the roller, a pivotal connection between the opposite end of the toggle lever and the axle assembly, engine power actuated means whereby the toggle lever is extended or retracted so as to swing the jack shaft about its pivotal support from a raised position to a lowered position or vice versa, means whereby a driving connection between the transmission shaft and the jack shaft is automatically connected or disconnected during pivotal movement of the jack shaft and means whereby the jack shaft is supported in its raised position.

3. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, a toggle lever pivotally connected at one end of the jack shaft at a point adjacent the roller, a pivotal connection between the opposite end of the toggle lever and the axle assembly, engine power actuated means whereby the toggle lever is extended or retracted so as to swing the jack shaft about its pivotal support from a raised position to a lowered position or vice versa, means whereby a driving connection between the transmission shaft and the jack shaft is automatically connected or disconnected during pivotal movement of the jack shaft and a spring clip engaging and securing the roller on the jack shaft when in the raised position.

4. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, a toggle lever pivotally connected at one end of the jack shaft at a point adjacent the roller, a pivotal connection between the opposite end of the toggle lever and the axle assembly, engine power actuated means whereby the toggle lever is extended or retracted so as to swing the jack shaft about its pivotal support from a raised position to a lowered position or vice versa, means whereby a driving connection between the transmission shaft and the jack shaft is automatically connected or disconnected during pivotal movement of the jack shaft and means securing the roller end of the jack shaft against lateral movement with relation to its longitudinal axis when in lowered position.

5. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, a toggle lever pivotally connected at one end of the jack shaft at a point adjacent the roller, a pivotal connection between the opposite end of the toggle lever and the axle assembly, engine power actuated means whereby the toggle lever is extended or retracted so as to swing the jack shaft about its pivotal support from a raised position to a lowered position or vice versa, means whereby a driving connection between the transmission shaft and the jack shaft is automatically connected or disconnected during pivotal movement of the jack shaft and means securing the roller end of the jack shaft against lateral movement with relation to its longitudinal axis when in the raised or lowered position.

6. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, a toggle lever pivotally connected at one end of the jack shaft at a point adjacent the roller, a pivotal connection between the opposite end of the toggle lever and the axle assembly, engine power actuated means whereby the toggle lever is extended or retracted so as to swing the jack shaft about its pivotal support from a raised position to a lowered position or vice versa, means whereby a driving connection between the transmission shaft and the jack shaft is automatically connected or disconnected during pivotal movement of the jack shaft and a radius rod pivotally attached to the vehicle at one end and the jack shaft at the opposite end at a point adjacent the roller, said radius arm securing the jack shaft against lateral movement with relation to its longitudinal axis when in the raised or lowered position.

7. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, engine power actuated means connected with the roller end of the jack shaft whereby the shaft is swung about its pivotal support from a raised to a lowered position or vice versa and means whereby a driving connection between the transmission shaft and the jack shaft is automatically connected or disconnected during pivotal movement of the jack shaft.

8. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, engine power actuated means connected with the roller end of the jack shaft whereby the shaft is swung about its pivotal support from a raised position to a lowered position or vice versa, a gear secured on the jack shaft on the end opposite the roller and a gear on the transmission shaft, said jack shaft gear adapted to be moved into and out of mesh with the transmission shaft gear during pivotal movement of the jack shaft.

9. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, engine power actuated means connected with the roller end of the jack shaft whereby the shaft is swung about its pivotal support from a raised position to a lowered position or vice versa, a gear secured on the jack shaft on the end opposite the roller, a gear on the transmission shaft, said jack shaft gear adapted to be moved into and out of mesh with the transmission shaft gear during pivotal movement of the jack shaft, a thrust bearing on the end of the jack shaft adjacent the jack shaft gear and stationary side thrust members to receive and guide the thrust bearing during pivotal movement of the jack shaft.

10. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, engine power actuated means connected with the roller end of the jack shaft whereby the shaft is swung about its pivotal support from a raised to a lowered position or vice versa, means whereby a driving connection between the transmission shaft and the jack shaft is automatically connected or disconnected during pivotal movement of the jack shaft and means for automatically indicating whether the jack shaft is in raised or lowered position.

11. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, engine power actuated means connected with the roller end of the jack shaft whereby the shaft is swung about its pivotal support from a raised to a lowered position or vice versa, means whereby a driving connection between the transmission shaft and the jack shaft is automatically connected or disconnected during pivotal movement of the jack shaft and spring means for automatically securing and supporting the jack shaft in its raised position.

12. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, engine power actuated means connected with the roller end of the jack shaft whereby the shaft is swung about its pivotal support from a raised to a lowered position or vice versa, means whereby a driving connection between the transmission shaft and the jack shaft is automatically connected or disconnected during pivotal movement of the jack shaft, means for automatically securing and supporting the jack shaft in its raised position and means securing the roller end of the jack shaft against lateral movement with relation to its longitudinal axis when in the lowered position.

13. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, engine power actuated means connected with the roller end of the jack shaft whereby the shaft is swung about its pivotal support from a raised to a lowered position or vice versa, means whereby a driving connection between the transmission shaft and the jack shaft is automatically connected or disconnected during pivotal movement of the jack shaft and a crowned face formed on the jack shaft roller.

14. The combination with the transmission shaft on a motor driven vehicle of a jack shaft, a pivotal support for the shaft adjacent one end thereof, permitting said jack shaft to occupy a raised position parallel to the traction surface or a lowered position with one end thereof in contact with the traction surface, a roller secured on the opposite end of the shaft, engine power actuated means connected with the roller end of the jack shaft whereby the shaft is swung about its pivotal support from a raised position to a lowered position or vice versa, a gear secured on the jack shaft on the end opposite the roller and a gear on the transmission shaft, said jack shaft gear adapted to be moved into and out of mesh with the transmission shaft gear during pivotal movement of the jack shaft, said teeth having pointed outer ends to permit face to face meshing of the gears during pivotal movement of the jack shaft.

15. The combination with the transmission shaft on a motor driven vehicle of a rigid jack shaft, a pivotal support for the jack shaft adjacent one end thereof permitting said jack shaft to occupy a raised position parallel to the traction surface or a lowered position with one end of the same in contact with the traction surface, a roller on one end of the jack shaft to permit movement of the same over the traction surface, engine power actuated means connected with said last mentioned end of the jack shaft whereby the jack shaft may be swung about its pivotal support from its raised position to its lowered position or vice versa, and a driving connection between the transmission shaft and the jack shaft.

16. The combination with the transmission shaft on a motor driven vehicle of a rigid jack shaft, a pivotal support for the jack shaft adjacent one end thereof permitting said jack shaft to occupy a raised position parallel to the traction surface or a lowered position with one end of the same in contact with the traction surface, a roller on one end of the jack shaft to permit movement of the same over the traction surface, engine power actuated means connected with said last mentioned end of the jack shaft whereby the jack shaft may be swung about its pivotal support from its raised position to its lowered position or vice versa, and means whereby a driving connection between the transmission shaft and the jack shaft is automatically connected or disconnected during pivotal movement of the jack shaft.

17. The combination with the transmission shaft on a motor driven vehicle of a rigid jack shaft, a pivotal support for the jack shaft adjacent one end thereof permitting said jack to occupy a raised position parallel to the traction surface or a lowered position with one end of the same in contact with the traction surface, a roller on one end of the jack shaft to permit movement of the same over the traction surface, engine power actuated means connected with said last mentioned end of the jack shaft whereby the shaft may be swung about its pivotal support from its raised position to its lowered position or vice versa, a thrust bearing on an end of the jack shaft adjacent its pivotal connection, and means whereby a driving connection between the transmission shaft and the jack shaft is automatically connected or disconnected during pivotal movement of the shaft.

18. The combination with the transmission shaft on a motor driven vehicle of a rigid jack shaft, a pivotal support for the jack shaft adjacent one end thereof permitting said jack to occupy a raised position parallel to the traction surface or a lowered position with one end in contact with the traction surface, a roller on one end of the jack shaft to permit movement of the same over the traction surface, means to swing the jack shaft about its pivotal support from its raised position to its lowered position and vice versa, a driving connection between the transmission shaft and the jack shaft, and a spring clip secured to the vehicle to hold said jack shaft in its raised position.

19. The combination with the transmission shaft on a motor driven vehicle of a rigid jack shaft, a pivotal support for the jack shaft adjacent one end thereof permitting said jack shaft to occupy a raised position parallel to the traction surface or a lowered position with one end in contact with the traction surface, a roller on one end of the jack shaft to permit movement of the same over the traction surface, engine power actuated means connected with the said last mentioned end of the jack shaft whereby the shaft may be swung about its pivotal support from its raised position to its lowered position or vice versa, means whereby a driving connection between the transmission shaft and the jack shaft is automatically connected or disconnected during pivotal movement of the jack shaft, a spring clip secured to the vehicle to hold said jack shaft in its raised position, and means for securing the roller end of the jack shaft against lateral movement with relation to its longitudinal axis when in a lowered position.

20. The combination with the transmission shaft on a motor driven vehicle of a rigid jack shaft, a pivotal support for the jack shaft adjacent one end thereof permitting said jack shaft to occupy an inoperative position above the traction surface or an inclined position with one end in contact therewith, a roller secured on the last mentioned end of the jack shaft, a toggle lever pivotally connected at an end of the jack shaft at a point adjacent the roller, a pivotal connection between the opposite end of the toggle lever and the axle assembly, engine power actuated means whereby the toggle lever is extended or retracted to swing the jack shaft about its pivotal support from its raised position to its lowered position in contact with the traction surface or vice versa, means whereby a driving connection between the transmission shaft and the jack shaft is automatically connected or disconnected during pivotal movement of the jack shaft, and a spring clip to hold said jack shaft in its elevated position.

BROOKS WALKER.